United States Patent [19]

Hopwell et al.

[11] Patent Number: 4,787,787

[45] Date of Patent: Nov. 29, 1988

[54] SHEET MATERIAL MACHINING SYSTEM

[75] Inventors: Ernest E. Hopwell, Kilsby; Michael G. Bayes, Willenhall, both of United Kingdom

[73] Assignees: Marwin Production Machines Limited, Wednesfield; British Aerospace Public Limited Co., London, both of England

[21] Appl. No.: 31,053

[22] Filed: Mar. 27, 1987

[30] Foreign Application Priority Data

Mar. 27, 1986 [GB] United Kingdom ............... 8607645

[51] Int. Cl.$^4$ .................... B23Q 3/00; B23Q 11/10
[52] U.S. Cl. .................... 409/219; 83/451; 83/169; 269/20; 408/56; 409/136
[58] Field of Search ............... 269/20, 35; 83/402, 83/451, 169; 408/56, 61; 409/135, 136, 137, 219, 225

[56] References Cited

U.S. PATENT DOCUMENTS

| | | | |
|---|---|---|---|
| 3,488,674 | 1/1970 | Simjian | 269/20 |
| 3,964,355 | 6/1976 | Daniels | 269/20 |
| 3,979,984 | 9/1976 | Daniels | 269/20 |

FOREIGN PATENT DOCUMENTS

| | | | |
|---|---|---|---|
| 2141957 | 3/1972 | Fed. Rep. of Germany | 269/20 |
| 2854551 | 6/1979 | Fed. Rep. of Germany | 83/402 |

Primary Examiner—Gil Weidenfeld
Assistant Examiner—Daniel W. Howell
Attorney, Agent, or Firm—Cushman, Darby & Cushman

[57] ABSTRACT

The invention provides work piece support apparatus for supporting resilient sheet material during a machining operation, e.g., routing, in which the support apparatus includes hydrostatic clamping means comprising perforated support pads positioned each side of the resilient material and connected to a fluid supply. By this arrangement a fluid layer under relatively high pressure is interposed between each pad and the adjacent region of sheet material which is thus fluid pressure supported in the immediate vicinity of the routing tool throughout the machining process. The invention beneficially provides a routing machine including the work piece support apparatus in which the work piece is positioned in a generally vertical plane and the routing tool is mounted about a generally horizontal axis.

5 Claims, 8 Drawing Sheets

SHEET MATERIAL MACHINING SYSTEM

This invention relates to a system for machining resilient sheet material and in particular, but not exclusively, to apparatus for supporting resilient sheet material during a machining operation.

Profiled sheet metal flats or blanks are commonly fabricated in the aircraft industry by routing around a profile to produce a component of the required shape. In several existing machines, a stack of sheet metal blanks are drilled and riveted together, clamped to a sacrificial base, loaded onto the horizontal table of a numerically - controlled vertical spindle routing machine and routed along the programmed profiles. On completion of the routing operation, the sheets are separated, part marked and moved to a further work station. The profile path, nesting of the various profiles and attachment and release of the stacked sheets are performed under computer control.

One major problem with this known process is in the out-of-balance of component stocks and the associated high work-in-progress costs. The ability to machine a single sheet or a low multiple sheet configuration would enable component stocks to be better balanced and allow the work-in-progress to be managed more effectively.

Furthermore, there would be added benefit in providing the ability to carry out a routing operation in order to produce a component blank or a series of blanks without the need to provide a sacrificial base on which the sheet metal flat or flats is supported and located.

According to one aspect of this invention, there is provided work piece support apparatus for supporting resilient sheet material during a machining operation, for example routing, comprising pad means provided adjacent each side of said sheet material surrounding the region of the material to be machined, and fluid supply means for interposing a flow of fluid at a relatively high pressure between each pad means and the adjacent region of the sheet material. The sheet material may comprise a single sheet or a plurality of stacked sheets.

By this arrangement the sheet is fluid pressure supported against excessive movement during the machining process; thus single sheets and stacks of sheets may be machined without the need for a sacrificial support.

Preferably each of said pad means includes a pressure pad positioned adjacent the surface of the work piece and one or more fluid chambers formed within said pad means, said pressure pad including fluid outlet openings communicating with said chamber or chambers, said chamber or chambers including fluid inlet means for connection to said fluid supply means. Preferably said work piece support means includes clamping means for locating and supporting said work piece over at least a portion of the periphery of said work piece.

According to another aspect of this invention, there is provided a routing machine having a machine tool spindle mounted for rotation about a generally horizontal axis and work piece support means for supporting sheet material in a generally vertical plane, said support means including fluid pressure pad means adjacent each side of said sheet material generally surrounding the region of the material to be machined and fluid supply means for interposing fluid at pressure between said pads and the respective adjacent surface of the sheet material.

By way of example only, one specific embodiment of the invention will now be described in detail, reference being made to the accompanying drawings in which.

Figure 2:
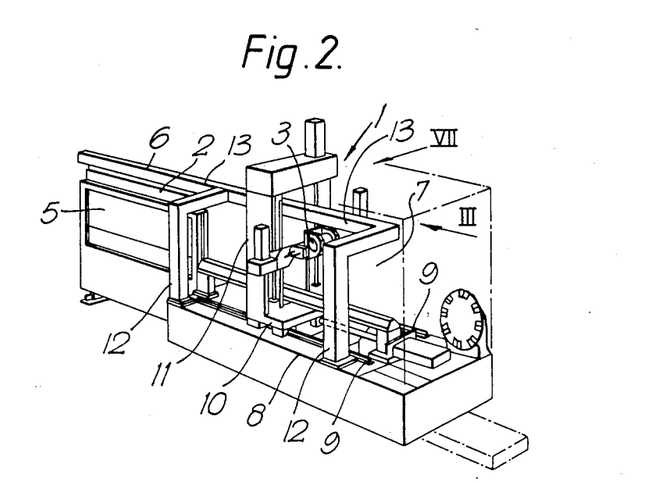
FIG. 2 is an alternative pictorial presentation of a sheet profile manufacturing system incorporating the present invention.
Figure 3:
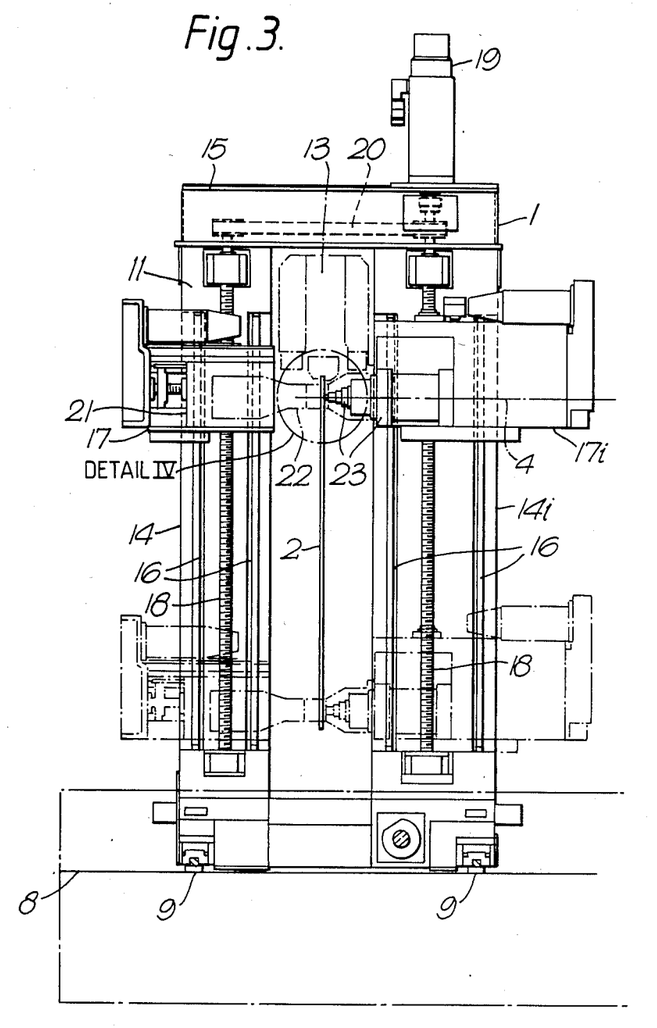
FIG. 3 is a front elevation on the work piece support and machining apparatus in direction of arrow III in FIG. 2.
Figure 7:
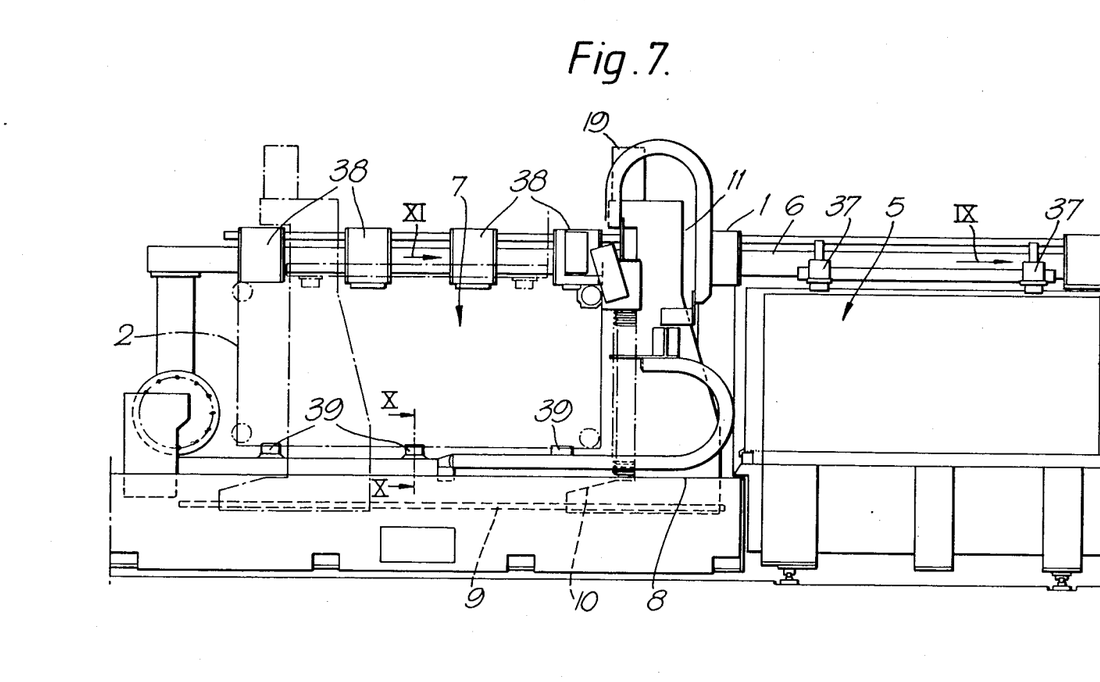
FIG. 7 is a general side elevation on the manufacturing system in direction of arrow VII in FIG. 2.

Referring to the Figures there is illustrated a multi-axis single spindle high speed routing machine 1 for routing or profile machining sheet material under computerized numerical control and in which the work piece 2, ie, the resilient sheet material, is positioned in a generally vertical plane and the spindle or routing tool 3, is mounted about a generally horizontal axis 4. The work piece 2 is loaded manually in the loading area 5, as indicated in FIGS. 2 and 7 and as hereinafter described and transferred by means of an overhead transfer mechanism 13 and indexed into the working area 7 where it is clamped for the machining operation. On completion of the machining cycle, the work piece 2 is automatically transferred from the working area 7 back to the loading area 5 for manual unloading by the operator. The loading arrangement is so configured to provide dual work pieces such that a shuttle transfer arrangement will simultaneously place into the working area 7 a blank work piece when the machined work piece is withdrawn. In this context it should be explained that each work piece 2 may comprise a single sheet or a stack of sheets up to a maximum of five.

The routing machine comprises a fixed bed 8 to which are mounted a pair of guide bars 9 for slidably supporting a platen 10 for movement in the x-axis, ie, the fore and aft direction, and which itself supports a portal frame 11. Additionally mounted upon the fixed bed 8 is the support structure 6 and 12 for supporting the longitudinally extending work piece clamping and transfer mechanism 13 which extends rearwards to overlie and form an integral part of the loading area 5.

The portal frame 11 comprises two vertical pillars 14 and 14i bridged by a fabricated horizontal beam portion 15. Each vertical pillar 14 and 14i includes a pair of vertical guide bars 16 slidably engaging platens 17 and 17i respectively for movement in the Y-axis, ie, the vertical direction. Each platen 17 and 17i includes an underslung double nut assembly (not shown) engaging individual recirculating ball lead screws 18 driven by a common Y-axis drive motor 19 mounted on the horizontal beam portion 15. By this arrangement the respective left hand platen 17 and right hand platen 17i are constrained to move synchronously in the Y-axis by means of an interconnection between the respective ball lead screws 18 in the form of a pulley and drive belt assembly 20 contained within the beam portion 15.

Figure 4:
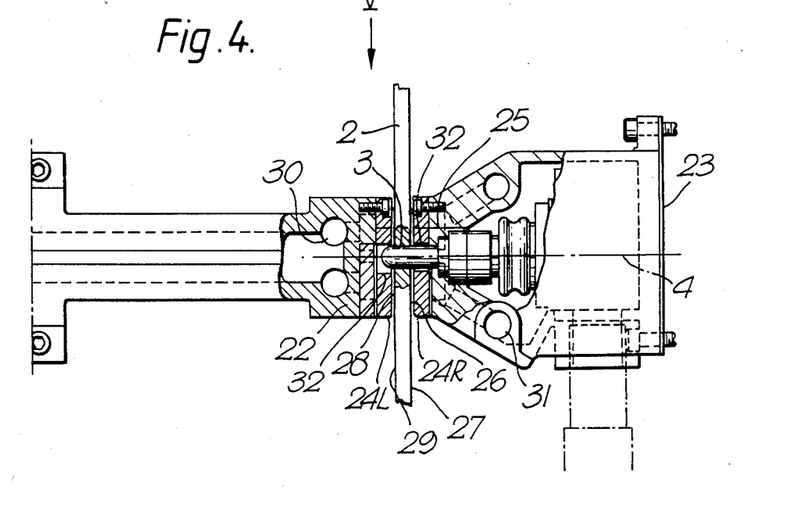
FIG. 4 is a detailed arrangement of the work piece support and machining apparatus as indicated as detail IV in FIG. 3.

Each platen 17 and 17i includes a pair of horizontal guide bars (not shown). The left hand platen 17 includes a pair of horizontally disposed guide bars (not shown) which slidably engage a light fabricated platen 21 on which is mounted the left hand hydrostatic pressure pad assembly 22 for movement in the Z-axis. The right hand platen 17i includes a pair of horizontally disposed guide bars (not shown) which support a cast aluminum housing 23 carrying the horizontally disposed high speed machine tool spindle 3 for movement in the Z-axis. Both the platen 21 and the machine tool spindle 3 are driven in the Z-axis by means of separate ball lead screw arrangements, not shown for reasons of clarity. As illustrated in FIG. 4 a datum hydrostatic pressure pad 24R is located to an outrigger support mounting 25 mounted directly on the Y-axis platen 17i, and the respective hydrostatic pressure pads 24L and 24R, the housing 23 and the machine tool spindle 3 are symmetrically disposed about the horizontal axis 4. The support mounting, 25 is arranged internally to accommodate lateral movement of the machine tool spindle 3 along the horizontal axis 4.

The datum hydrostatic pressure pad 24R being mounted, as stated above, on the Y-axis platen 17i will be constrained to move only in the Y-axis, that is, in a vertically upwards or downwards direction. This pad will therefore be fixed in the Z-axis relative to the work piece being machined such that the datum face 26 will be at a fixed pre-set position to provide a gap of 0.25 mm (0.01 inches) with the adjacent work piece datum face 27. The hydrostatic pressure pad assembly 22 being movable, as previously stated, in the Z-axis, is programmed to maintain a similar gap of 0.25 mm (0.01 inches) between the pad face 28 and the adjacent work piece face 29. The amount of pad movement in the Z-axis to achieve this desired gap is determined by the overall work piece thickness in any particular machining operation.

Figure 5:
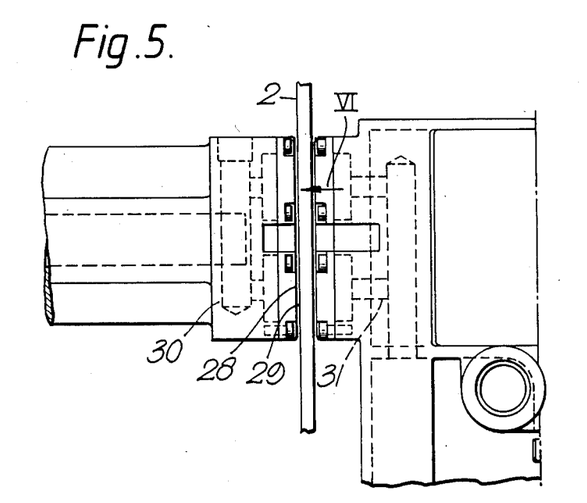
FIG. 5 is a plan view of this same arrangement in direction of arrow V in Figure IV.
Figure 6:
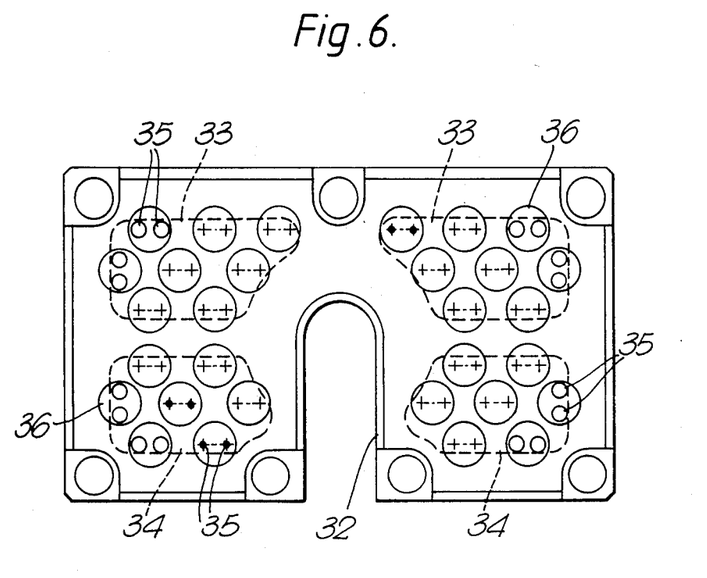
FIG. 6 is an elevation on the pressure pad of the support apparatus in direction of arrow VI in FIG. 5 and is common to both left hand and right hand support pads.

Referring now to FIGS. 4–6 inclusive, the hydrostatic work piece support apparatus will now be described in more detail. In FIGS. 4 and 5 the two hydrostatic pad assemblies are shown in position whilst the machine tool spindle 3 routes the work piece 2. The hydrostatic pressure body assemblies 22 and 25 each includes a porting system 30 and 31 respectively for supplying a suitable hydrostatic fluid at pressure to each respective hydrostatic pressure pad 24L and 24R. As illustrated in FIG. 6, the hydrostatic pressure pads 24L and 24R are generally rectangular and include a centralized vertical slot 32 shaped to accommodate and give clearance to the machine tool spindle 3. The downwardly extending slot 32 additionally allows swarf and coolant to fall freely away during machining.

The pad also includes, on the rearward face four recesses 33 and 34 which interconnect with the porting system 30 and 31, each recess defining a plenum chamber for supplying hydrostatic fluid to an arry of hole pairs 35 grouped as shown across the surface of the pad. Each pair of holes extend toward the outer face of the plate terminating in a counterbore 36 to provide improved fluid dispersion across the pad face.

Figure 8:
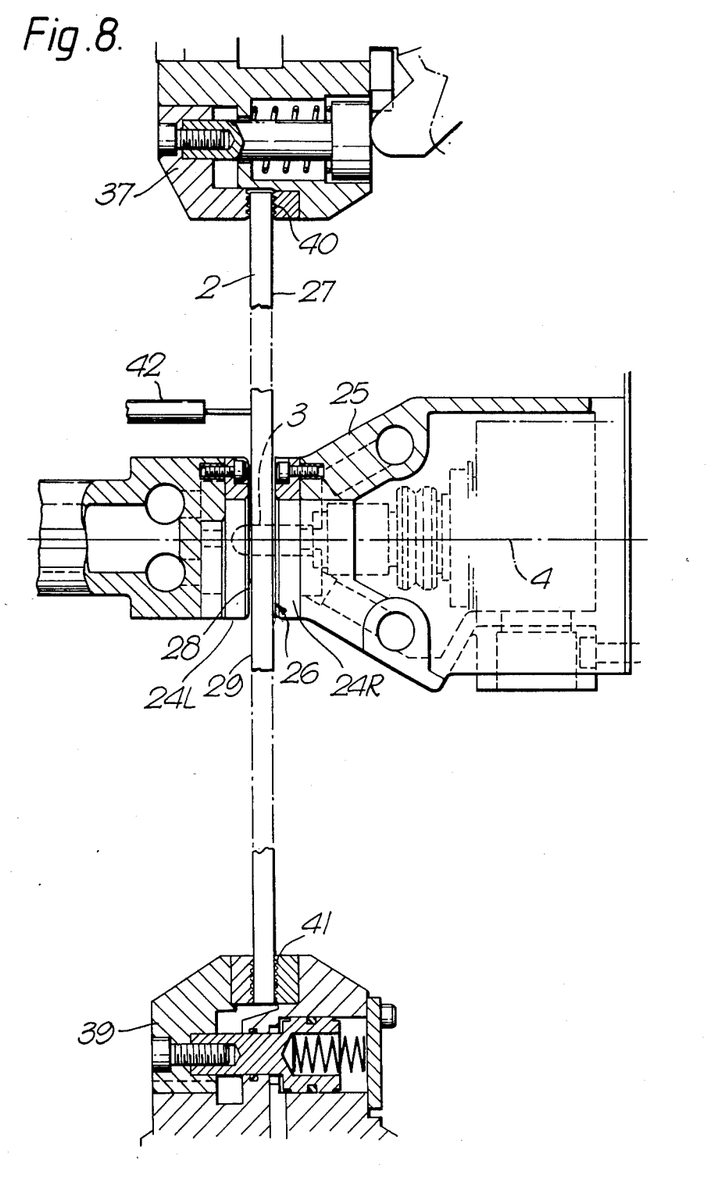
FIG. 8 is a diagrammatic end view illustrating the general lateral disposition of the sheet clamps and the support apparatus of the present invention.
Figure 9:
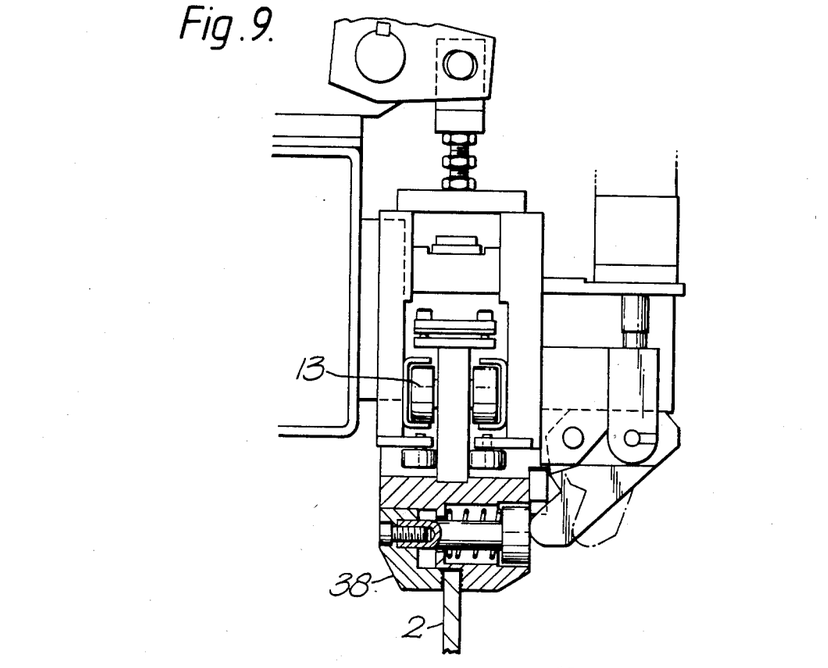
FIG. 9 is an end elevation, part sectioned for clarity, illustrating an upper sheet transfer clamp in direction of arrow IX in FIG. 7.
Figure 10:
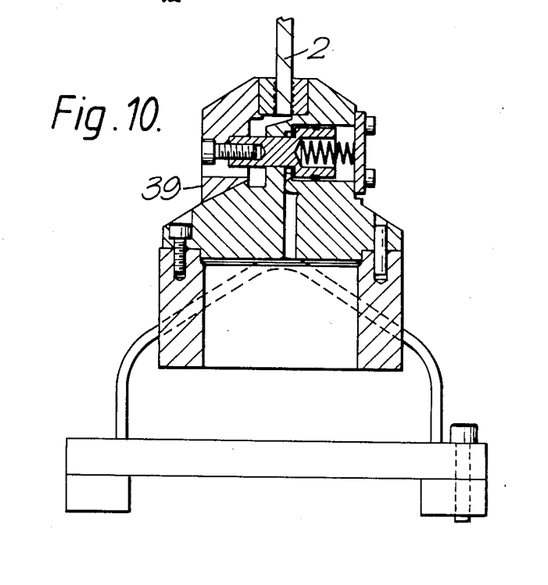
FIG. 10 is a cross-section through a typical lower sheet clamp in direction of arrows X—X in FIG. 7.
Figure 11:
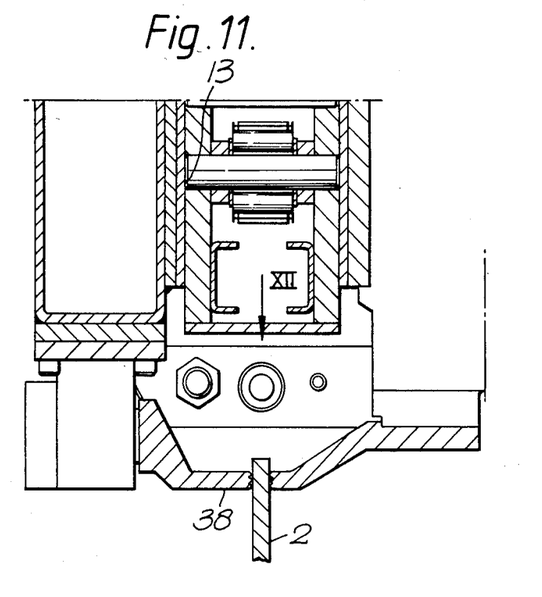
FIG. 11 is an end view on an upper sheet clamp in direction of arrow XI in FIG. 7.
Figure 12:
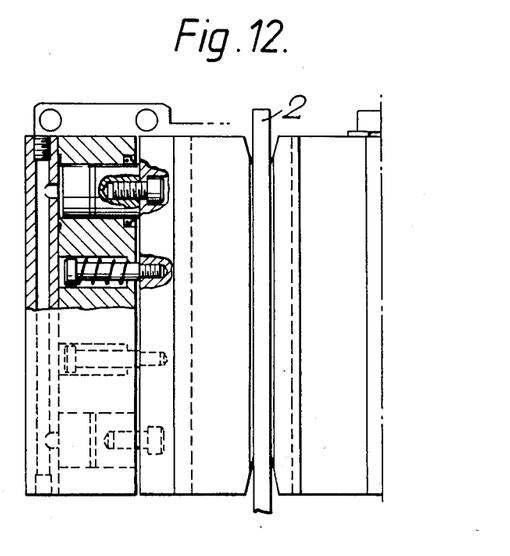
FIG. 12 is a plan view on the upper sheet clamp in direction of arrow XII in FIG. 11.

In operation, and with particular reference to FIG. 7–12 inclusive, a work piece sheet 2 or stack of sheets in loaded manually in the loading area 5 and clamped at its horizontal upper edge by a pair of hydraulically actuated spring loaded clamps 37 incorporated into the overhead transfer system 13 by which means the sheet is transferred into the working area 7 and clamped by means of four hydraulic clamps 38 at its upper longitudinal edge and three hydraulic clamps 39 at its lower longitudinal edge. The overall thickness of the work piece is sensed by a suitably located linear voltage displacement transducer and the z-axis actuator controlling the hydrostatic pressure pad assembly 22 is operated to place the pad face 28—at the correct gap with respect to the adjacent work piece face 29—as shown in FIG. 8. This Figure illustrates the lateral spaced relationship between the upper and lower clamps and the hydrostatic pressure pads 24. In this figure the upper clamp 37 depicted is that for the sheet transfer phase but is equally applicable to the upper clamps 38 within the working area 7.

The serrated faces 40 and 41 on the upper and lower clamps define the vertical datum face 27 of the work piece 2 and ensure the correct working gap with the fixed pad datum face 26 as previously described. Sheet thickness tolerances or the total overall thickness of a multiple sheet work piece are sensed by the linear voltage displacement transducer 42 and the left hand pressure pad assembly 22 adjusted accordingly to achieve the desired gap at the pad face 28. The upper and lower clamps are therefore adjustable such that the serrated jaw remote from the datum face 27 is movable to accommodate variable work piece thicknesses. Typical clamp arrangement though not described in detail here are illustrated in FIGS. 9–12 inclusive.

With the work piece properly located with respect to the hydrostatic pressure pad assembly, the hydrostatic fluid pump, (not shown) is operated to supply fluid at high pressure, typically 150 lbs/sq inch to each respective pressure pad 24L and 24R the fluid being ejected through the hole pairs 35 to support the sheets or sheets against movement in the Z direction during the machining process, by means of a supporting fluid surface layer.

In operation, with the workpiece sheet 2 or stack of sheets kept stationary during machining the hydrostatic pressure pad assembly moves simultaneously with the machine tool spindle, throughout the machining cycle providing pressurized fluid support in the immediate vicinity of the spindle, the combination of movements in the X, Y and Z axes all controlled by a computer in accordance with set pre-programmed instructions.

The hydrostatic fluid in addition to its support function simultaneously acts as a coolant at the cutting face and a swarf dispersal medium. The machine further includes an underfloor coolant and swarf removal system.

Figure 1:
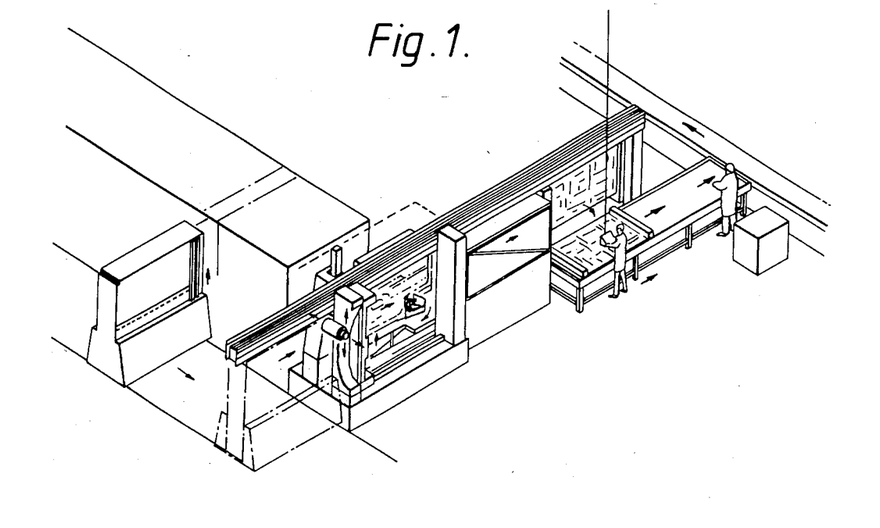
FIG. 1 is a pictorial presentation of a sheet profile manufacturing system incorporating the present invention.

On completion of the machining cycle the sheet or sheets are transferred by the sheet transfer device 6 back into the loading area 5 for subsequent handling and a new work piece load may simultaneously be transferred to the working area 7. Alternatively, as illustrated in FIG. 1 a sheet profile manufacturing system can be provided with a through feed system whereby the completed work piece can be passed forwards for further proessing at an immediately adjacent work station.

The hydrostatic work piece support system and the multi-sheet routing system of the present invention offer the following advantages:

1. Single and multi sheets can be routed without any previous preparation such as drilling and fixing down or drilling and riveting.

2. It is a simple matter to alternate sheet handling.

3. Having eliminated preparation operations then the full automation of the process up to flexible manufacturing system standards is possible.

4. By using single or any number of sheets up to at least five then stock and work-in-progress can be set to suit managements requirements rather than the machine set-up requirements.

It is to be noted that the specific details of the construction of the pads and the hydrostatic support features are by way of example only and thus the details of each may be changed significantly without departing from the invention.

We claim:

1. Workpiece support apparatus for hydrostatically supporting resilient sheet material in the vicinity of a machine tool spindle during a machining operation, for example routing, in which said resilient sheet material is fixedly located in a substantially vertical plane and said machine tool spindle lies along a substantially horizontal datum, said workpiece support apparatus comprising first fixed support pad means spaced apart from but closely adjacent one exposed outer face of said resilient sheet material and second support pad means including lateral adjustment means for receiving varying thicknesses of sheet and for adopting a substantially similar gap to said first support pad means, each of said support pad means being connected to fluid supply means for interposing and maintaining at pressure a balanced supporting layer of non-gaseous hydrostatic fluid between said pad means and said adjacent exposed outer face of said resilient sheet material whereby said workpiece support apparatus is constrained to move in a planar sense with said machine tool spindle to support and said resilient sheet material against induced vibration and distortions during cutting, spent hydrostatic fluid falling away from said support apparatus being utilized for dispersion of cutting swarf from the vicinity of said support apparatus.

2. Workpiece support apparatus according to claim 1 in which said resilient sheet material comprises a single sheet or a plurality of sheets and said apparatus includes adjustable clamping means for locating and supporting said resilient sheet material in a vertical plane over at least a portion of the periphery of said sheet material, said adjustable clamping means including a fixed vertical datum face against which one exposed face of said sheet material abuts at a pre-defined gap with respect to said first support pad means and an adjustable face to accommodate selected material thicknesses.

3. Workpiece support apparatus according to claim 1 in which said first and second support pad means includes a vertically disposed slot extending upwardly from the lower edge to substantially the mid-point of said pads and having an overall width greater than the diameter of said machine tool spindle, and fluid openings connected to said fluid supply means dispersed across the surface of said pads and generally surrounding said slot whereby during said machining operation the machine tool spindle is located at the upper extremity of said slot and the supporting layer of hydrostatic fluid supports said workpiece substantially around said machine tool spindle and provides a coolant flow to said machine tool spindle.

4. Workpiece support apparatus according to claim 1 in which said hydrostatic fluid is soluble oil and said hydrostatic pressure is substantially 150 lbs per square inch.

5. A routing machine having a workpiece located in a generally vertical plane, a machine tool mounted for rotation about a generally horizontal axis and workpiece support apparatus associated with said machine tool, said workpiece support apparatus including support pad means adjacent each side of said workpiece, said support pad means being connected to fluid supply means for interposing and maintaining at pressure a continuous balanced supporting layer of non-gaseous hydrostatic fluid between said pad means and said workpiece whereby said machine tool spindle and said workpiece support apparatus are programmed for planar movement in conjunction with each other relative to said workpiece, and said supporting layer of hydrostatic fluid supports said workpiece against locally induced vibrations and distortions during cutting, said fluid simultaneously functioning as a coolant and swarf disposal medium.

* * * * *